United States Patent [19]

Nakae et al.

[11] 4,446,254
[45] May 1, 1984

[54] CROSSLINKED POLYOLEFIN FOAM CONTAINING A HIGH CONCENTRATION OF AN INORGANIC MATERIAL AND PROCESS FOR PRODUCING THE SAME

[75] Inventors: Hiroyuki Nakae, Kawasaki; Isamu Noguchi, Tokyo; Masayuki Kondo, Yokohama, all of Japan

[73] Assignee: The Furukawa Electric Co., Ltd., Tokyo, Japan

[21] Appl. No.: 367,045

[22] Filed: Apr. 9, 1982

Related U.S. Application Data

[63] Continuation of Ser. No. 222,153, Jan. 2, 1981, abandoned.

[30] Foreign Application Priority Data

Feb. 21, 1980 [JP] Japan .............................. 55-20763
Oct. 29, 1980 [JP] Japan .............................. 55-151904

[51] Int. Cl.³ .............................................. C08J 9/06
[52] U.S. Cl. ............................ 521/92; 204/159.17; 204/159.2; 204/159.24; 521/79; 521/81; 521/93; 521/134; 521/140; 521/149; 521/907; 521/908; 521/909; 521/915; 524/436; 524/437
[58] Field of Search ................... 521/144, 149, 92, 93, 521/134, 140; 428/389; 260/42.29, 45.75 R; 204/159.17, 159.2

[56] References Cited

U.S. PATENT DOCUMENTS

| | | | |
|---|---|---|---|
| 3,651,183 | 3/1972 | Hosoda et al. | 521/144 |
| 3,696,059 | 10/1972 | Hosoda et al. | 521/134 |
| 3,818,086 | 6/1974 | Stastny et al. | 521/144 |
| 3,922,442 | 11/1975 | North et al. | 260/42.15 |
| 3,965,054 | 6/1976 | Nojiri | 521/144 |
| 4,020,214 | 4/1977 | MacKenzie, Jr. | 428/389 |
| 4,021,380 | 5/1977 | Nuttall | 521/144 |
| 4,026,841 | 5/1977 | Tomikawa et al. | 521/89 |
| 4,163,085 | 7/1979 | Kühnel et al. | 521/144 |
| 4,166,890 | 9/1979 | Fried et al. | 521/144 |
| 4,203,815 | 5/1980 | Noda et al. | 521/144 |

FOREIGN PATENT DOCUMENTS

| | | |
|---|---|---|
| 1930134 | 12/1969 | Fed. Rep. of Germany . |
| 2331190 | 1/1974 | Fed. Rep. of Germany . |
| 1170539 | 11/1969 | United Kingdom . |
| 1399587 | 7/1975 | United Kingdom . |

*Primary Examiner*—Morton Foelak
*Attorney, Agent, or Firm*—Frishauf, Holtz, Goodman & Woodward

[57] ABSTRACT

A crosslinked foam having an expansion ratio of 25 to 60 which comprises a composition containing 100 parts by weight of a resin component consisting of an ethylenevinyl acetate copolymer or a mixture thereof with a thermoplastic resin and 50 to 500 parts by weight of an inorganic powder material.

23 Claims, 4 Drawing Figures

CROSSLINKED POLYOLEFIN FOAM CONTAINING A HIGH CONCENTRATION OF AN INORGANIC MATERIAL AND PROCESS FOR PRODUCING THE SAME

This is a continuation of application Ser. No. 222,153 filed Jan. 2, 1981 abandoned.

The present invention relates to a crosslinked polyolefin foam having a high expansion ratio with fire retardancy and low smoke emission, which is obtained from a mixture of an ethylene-vinyl acetate copolymer with a large amount of an inorganic filler, and to a process for producing the same.

Generally, plastic foams have various uses as building materials, packaging materials or floating materials because they are superior in various characteristics such as light weight, thermal insulation, shock absorbancy and acoustic absorbability.

Of the plastics foams, polyolefins foams find extensive uses because they are superior in various chemical, mechanical and electrical characteristics to other plastic foams. The polyolefins, however, have an important drawback in that they are extremely flammable. Accordingly, strict requirements for fire retardancy have recently been demanded for various materials containing the polyolefins from the viewpoint of preventing accidents resulting from fire.

As methods for rendering polyolefins fire-retardant, it is known to mix the polyolefins with a halogen containing fire retardant or with a relatively large amount of inorganic powder materials.

The method of admixing the polyolefins with the halogen containing fire retardants presents the advantage that a fire retardant product can be obtained relatively easily. The fire retardants, however, can emit an extremely large amount of smoke including noxious or corrosive gases such as hydrogen halides or the like if the fire retardant materials catch fire, thus increasing the danger to human beings. Even if direct damage and injuries from the heat of a fire could be avoided, corrosive hydrogen halides emitted by this type of fire retardant would cause the corrosion of valuable equipment and instruments, signifying an important defect in the fire retardant.

On the other hand, the method of adding inorganic materials to the polyolefins provide fire retardant products which do not have such dangerous accompanying influences. It is also superior from the viewpoint of saving resources. It is difficult, however, to produce a foam having a high expansion ratio because there is remarkable escaping of the foaming gases upon foaming due to the inclusion of the large amount of inorganic powder materials. In particular, a foam in a continuous sheet form having a high expansion ratio and a favorable quality has not yet been realized.

The following description will be made concerning a few of prior art techniques. For example, Japanese Patent Application Publication No. 37,300/76 discloses a method of thermally foaming a mixture obtainable by adding a blowing agent and a crosslinking agent to a composition composed of a polyolefinic resin and aluminum hydroxide. This method provides a foam (density, 0.134 g/cm$^3$) having a maximum expansion ratio of 17.5 by charging into a closed mold a composition prepared by the addition of 0.25 part by weight of a crosslinking agent and 3.5 parts by weight of a blowing agent to a composition of 40 parts by weight of a high pressure process polyethylene and 60 parts by weight of aluminum hydroxide, and releasing the mold rapidly immediately after heating.

Japanese Patent Application Unexamined Publication No. 49,371/75 discloses another method of preparing a foam having a specific gravity of 0.15 to 0.18 by adding a large amount of an inorganic powder material to a vinyl chloride resin, kneading the mixture in a closed kneader, stirring the mixture after the addition thereto of a solution of liquified butane or the like, charging the mixture into a closed mold under elevated pressure, and thermally foaming the mixture at two stages into a predetermined shape.

Japanese Patent Application Unexamined Publication No. 85,649/73 discloses a further method by which a foam having an apparent specific gravity of 0.08 to 0.18 was obtained by adding a blowing agent and a crosslinking agent to a composition including 10 to 50% by weight of a thermoplastic resin containing an ethylene-vinyl acetate copolymer and 50 to 90% by weight of an inorganic filler containing calcium sulfite as an essential component, mixing the mixture homogeneously to mold it into a plate form, heating the plate at 200° C. for 10 minutes under elevated pressure, and reducing the pressure rapidly. In this method, as in the above prior art methods, the expandable or foamable composition is charged into a closed container such as a mold or the like, and pressure is applied thereto from the outside in order to suppress free expansion. Under this condition, the crosslinking agent and the blowing agent are decomposed and then the pressure is reduced rapidly, thus providing the foam.

These prior art methods involve in each case methods in which the expandable or foamable composition is charged into the mold and thermal foaming is effected under elevated pressure. They, however, have difficulty in providing closed-cell foam having an expansion ratio exceeding 20. And these methods do not produce a continuous foam sheet.

As a result of extensive studies of filler compositions of various thermoplastic resins, mainly, olefinic polymers, and inorganic powder materials, it has been found that ethylene-vinyl acetate copolymers show characteristics of maintaining molding processability with relatively low reduction in mechanical properties such as a tensile strength, even if inorganic powders are included in large amounts and the ethylene-vinyl acetate copolymers are superior as polymers for use with inorganic fillers. It has also been found that, where aluminum hydroxide powders are included in a high concentration, the ethylene-vinyl acetate copolymers can achieve a remarkably higher fire retardancy than polyethylene or polypropylene because of synergy of the vinyl acetate groups with the aluminum hydroxide powders.

Therefore, the present inventors have accomplished this invention by providing fire retardant foam with less smoke if burned which is obtainable at low cost and can contribute to saving natural resources. The fire-retardant foam is produced by highly foaming an ethylene-vinyl acetate copolymer composition containing a high concentration of inorganic fillers.

Thus, the present invention provides a foam having a remarkably high expansion ratio comprising a composition containing an extremely large amount of inorganic fillers or the like, and a process for preparing such a foam.

The foams in accordance with the present invention are crosslinked polyolefin foams having an expansion ratio of 25 to 60 which comprise compositions containing 50 to 500 parts by weight of an inorganic powder material with respect to 100 parts by weight of a resin component comprising ethylene-vinyl acetate copolymer alone or a mixture thereof with other thermoplastic resins.

The foams in accordance with the present invention are foams having a high expansion ratio containing a large amount of inorganic materials. In many cases, as the total amount of additive components predominantly including the inorganic materials and other additives is greater than the amount of the polymer components, the foams in accordance with the present invention may instead be called foams of inorganic materials from the viewpoint of composition. They combine favorable flexibility and processability provided by the polymers with advantageous properties provided by the inorganic materials. A proportion of the polymer in the foams is extremely small and, in many cases, amounts to 20 g/l or less (2% by volume or less when the specific gravity of the polymer is 1).

The foam in accordance with the present invention have the following major characteristics:

(1) Although a large amount of inorganic fillers is added, the foams are the crosslinked foams with an extremely high expansion ratio (the ratio of the density of the composition to the density of the foam) reaching 40 times or higher.

(2) The foams may take the form of a continuous sheet without limits on the length.

(3) The oxygen indices are extremely high, usually 30 to 75. When forced to burn, the foams in accordance with the present invention do not yield any flaming drips which may assist the spread of a fire.

(4) The evolution of smoke and heat build-up are extremely low during forced burning.

(5) The heat resistance is remarkably high.

Although crosslinking polyethylene foams are deformed beyond recognition of their original forms at temperatures higher than 130° C., the foams in accordance with the present invention are deformed in contraction by only a several percent even at 150° to 180° C. The latter foams have the characteristic that their shapes are maintained even at portions around the fire burning forced burning, without any abnormal deformation.

With respect to item (4) above, special mention should be made of the fact that the foams in accordance with the present invention have both extremely high fire retardancy and low smoke emission although they are burnable materials. A zinc-coated iron plate laminated with the foam in accordance with the present invention, having a thickness of, for example, about 4 mm was tested for flame retardancy. The test was carried out in accordance with the surface test in item 3 of JIS (Japanese Industrial Standard) A 1321-1975 "Testing Method for Incombustibility of Internal Finish Material and Procedure of Buildings". The test results were determined by the following two factors, that is, a fuming factor ($C_A$) per unit area and an area ($td\theta$) enclosed by an exhaust temperature curve and a reference temperature curve where the exhaust temperature curve lies above the reference temperature curve, wherein the fuming factor ($C_A$) per unit area is an index indicating the amount of smoke generated during the burning, and the area ($td\theta$) is an index for the heat of combustion. The foams in accordance with the present invention satisfy the predetermined values; $C_A \leq 30$ and $td\theta = 0$, and it was found that they ranked as the highest with respect to smoke emission and heat build-up in accordance with the above test methods, that is, they satisfied the requirements specified for "grade 1 incombustibility". Conventional polyolefin foams cannot achieve these requirements, and the foams according to the present invention have realized these requirements for the first time.

With respect to the oxygen index, item (3), JIS D 1201-1973 "Test Method for Flammability of Organic Interior Materials for Automobiles" provides that materials having an oxygen index exceeding 30 are ranked as "fire retardant I" which corresponds to the highest rating grade. The foams in accordance with the present invention conform to this rating.

The foams in accordance with the present invention may be prepared by the following method involving chemical crosslinking.

The method for preparing foams having a high expansion ratio and containing a high concentration of inorganic fillers is characterized by thermally foaming an expandable composition containing 100 parts by weight of a resin component composed of an ethylene-vinyl acetate copolymer or a blend thereof with a compatible thermoplastic resin, 50 to 500 parts by weight of an inorganic filler powder, 5 to 50 parts by weight of a blowing agent and 0.1 to 10 parts by weight of a crosslinking agent at temperatures higher than the decomposition temperatures of the blowing agent and the crosslinking agent in such a way that the water content is not higher than 0.15% by weight and, more preferably, not higher than 0.07% by weight.

As a result of extensive research on the chemical crosslinking and foaming of compositions of ethylene-vinyl acetate copolymers containing inorganic powder materials, it has been found that the foaming performance is influenced greatly by the water content in the expandable composition. Control of this water content permits easy realization of a foam having a remarkably high expansion ratio.

Figure 1:
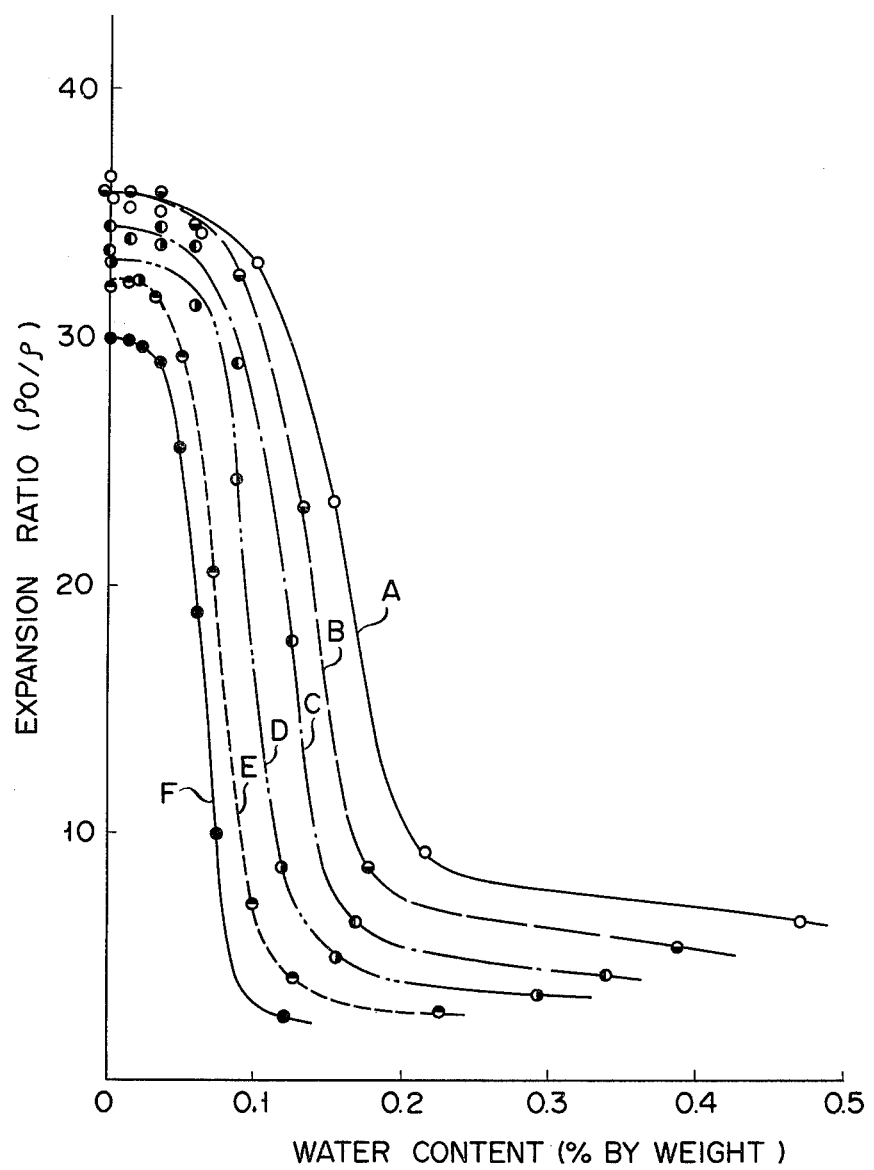
FIG. 1 is a graph illustrating the relationship between the water content (abscissa) of the expandable composition, and the expansion ratio ($\rho 0/\rho$) (ordinate) of the foams obtainable from the expandable composition.

Accordingly, in the present invention, the maintaining of the water content to a predetermined level plays a very important role in producing the foams in accordance with the present invention. The extent to which the foaming performance varies with the water content in the expandable compositions will be described in more detail by way of examples, and a typical example is shown in FIG. 1. FIG. 1 illustrates the relationship between the water content and the expansion ratio of crosslinked foams of the ethylene-vinyl acetate copolymer in admixture with a large amount of aluminum hydroxide powders and, when needed, halogen type fire retardants or the like. In FIG. 1, the water content is plotted along the abscissa and the expansion ratio $\rho 0/\rho$ of the foams is plotted along the ordinate, wherein $\rho$ is the density of the foam and $\rho 0$ is the density of the expandable composition. In FIG. 1, the curve A illustrates an example of the ethylene-vinyl acetate copolymer containing a high vinyl acetate content (61% by weight), and the curve F illustrates an example of the ethylene-vinyl acetate copolymer having a low vinyl acetate content (25% by weight). In FIG. 1, the copolymers used for the curves A and F are, respectively; an ethylene-vinyl acetate copolymer having a vinyl acetate content of 61% by weight (EVATHLENE 450-P; product of Dainippon Ink & Chemicals Inc.), and an ethylene-vinyl acetate copolymer having a vinyl acetate content of 25% by weight (EVAFLEX 360; product of Mitsui Polychemical Co., Ltd.). The copolymer used for the curve B is a mixture of 80 parts by weight of the former (EVATHLENE 450-P) with 20 parts by weight of the latter (EVAFLEX 360); the copolymer used for the curve C is a mixture of 60 parts by weight of the former with 40 parts by weight of the latter. The copolymer used for the curve D is a mixture of 40 parts by weight of the former with 60 parts by weight of the latter; and the copolymer used for the curve E is a mixture of 20 parts by weight of the former with 80 parts by weight of the latter. It is apparent at a glance that the lower the water content is, the higher the expansion ratio is. And the expansion ratio remains substantially constant regardless of the water content below a certain level (referred to hereinafter as "water content limit"). In the production of products of uniform quality on an industrial scale, the object can be achieved by maintaining the water content below the water content limit as stated hereinabove.

It is not exactly clear why the water content in the expandable composition exerts an influence on the foaming performance of the foam resulting therefrom. It has been found that, as a result of measurements of the gel content and the gel swelling degree of the foams, a small water content permits a more remarkable variation in the gel swelling degree than in the gel content. From this finding, it may be assumed that the water present in the expandable composition might function to increase the molecular weight between the crosslinks (Mc) in the ethylene-vinyl acetate copolymers.

The foams in accordance with the present invention may also be prepared by means of the ionizing radiation crosslinking method as follows:

This method involves preparing the foams from the expandable compositions containing the ethylene-vinyl acetate copolymers and inorganic materials by kneading and forming the composition containing 100 parts by weight of the resin component composed of ethylene-vinyl acetate copolymer having a vinyl acetate content of 40 to 90% by weight, or in a blend thereof with a thermoplastic resin, 50 to 500 parts by weight of the inorganic powder material, and 5 to 50 parts by weight of a blowing agent; crosslinking the composition by irradiation with ionizing radiation; and then thermally foaming the crosslinked composition at temperatures higher than the decomposition temperature of the blowing agent.

The ethylene-vinyl acetate copolymers to be used in the present invention are those having a vinyl acetate content ranging widely from 5 to 90% by weight. Usually, copolymers having a vinyl acetate content of 5 to 40% by weight are crystalline materials, and those having a vinyl acetate content of 40 to 90% by weight are completely noncrystalline materials. In each case, copolymers having a wide range of molecular weights, as shown by melt indices ranging from 0.1 to 300, may be employed for the present invention. Of these copolymers, the crystalline copolymers having melt indices of 0.5 to 10 and the noncrystalline copolymers having melt indices of 10 to 100 are preferably used.

In accordance with the present invention, it is preferred to use ethylene-vinyl acetate copolymers having a high vinyl acetate content and, specifically, a vinyl acetate content of 40 to 90% by weight and, more preferably, 55 to 70% by weight in the noncrystalline form. The reasons for this are that ethylene-vinyl acetate copolymers having such a high vinyl acetate content provide foams having a particularly high expansion ratio and readily allow industrial production because the water content limits of the compositions are large enough. This will be understood in comparing the curve A with the curve F in FIG. 1 in which the curve A indicates a copolymer having a high vinyl acetate content and the curve F indicates a copolymer having a low vinyl acetate content.

It is to be noted that the present invention includes within its scope the use of a single ethylene-vinyl acetate copolymer as stated hereinabove and the use of a blend thereof with a thermoplastic resin compatible with the copolymer, as the resin component of the expandable composition. In particular, where the ethylene-vinyl acetate copolymer to be used is a noncrystalline copolymer, it is preferable to use it as a blend with a crystalline polymer. Although the amount of the thermoplastic resin to be blended is not restricted, it may range usually from 20 to 80%. The thermoplastic resins to be used as blends may be various polymers usually commercially available and include olefin polymers. Of these, ethylene series polymers are preferred from the viewpoint of compatibility and processability. Illustrative of the ethylene polymers are: polyethylene, ethylene-α-olefin copolymer, ethylene-propylene copolymer, ethylene-vinyl acetate copolymer having a vinyl acetate content of 5 to 30%, ethylene-alkyl acrylate copolymer, ethylene-vinyl acetate-vinyl chloride copolymer and the like.

The present invention can provide most favorable foams from blends of noncrystalline ethylene-vinyl acetate copolymers with crystalline ethylene-vinyl acetate copolymers having a vinyl acetate content of 5 to 30% or with polyethylene.

In accordance with the present invention, although the inorganic material powders are not restricted to particular ones, they may include, for example, hydrated metal oxides such as aluminum hydroxide, magnesium hydroxide, basic magnesium carbonate or the like; metal oxides such as alumina, titania or the like; carbonates or bicarbonates such as calcium carbonate, magnesium carbonate, sodium bicarbonate or the like; borates such as zinc borate, borax, barium borate or the like; phosphates such as calcium phosphate, potassium metaphosphate or the like; silicates such as talc, clay or the like; sulfates or sulfites such as gypsum, calcium sulfite or the like; silica, hydrated silica and the like; or industrial waste materials such as blast furnace waste, red mud or the like. The hydrated metal oxides, for example, aluminum hydroxide, magnesium hydroxide and basic magnesium carbonate are preferred because they can provide fire-retarding foams. Aluminum hydroxide is particularly preferred because a mixture thereof with ethylene-vinyl acetate copolymers can achieve high fire retardancy.

The inorganic material powders may usually range from 0.01 to 30 μm in particle size, preferably from 0.05 to 10 μm and, more preferably, from 0.1 to 2 μm. When the particle size of the inorganic material powders to be used exceeds the upper limit, the extruded sheets tend to possess rough surfaces and the expansion ratio is reduced. When the particle size is smaller than the lower limit, it is difficult to provide and reproduce a uniform dispersion of the inorganic material powders in the polymer matrix, thereby resulting in a decrease in the expansion ratio.

The amount of the inorganic material powders to be added may be generally from 50 to 500 parts by weight, preferably from 80 to 250 parts by weight and more preferably, from 100 to 200 parts by weight. The reasons for this are that, when the amount thereof is too small, the effect of adding the inorganic material powders will not be achieved and, when the amount thereof is too great, it is difficult to provide a high expansion of foaming.

The blowing agents which may be formulated in accordance with the present invention may be various decomposing blowing agents of the organic type and of the inorganic type. The blowing agents of the organic type may include, for example, azodicarbonamide, N,N'-dinitrosopentamethylenetetramine, P,P'-oxybis-benzenesulfonyl hydrazide and the like. The blowing agents of the inorganic type may include, for example, sodium bicarbonate, ammonium carbonate, ammonium bicarbonate, calcium azide and the like.

The reasons why the amount of the blowing agent to be added is restricted to 5 to 50 parts by weight are that, when the amount thereof is less than 5 parts by weight, no foams having a high expansion ratio can be prepared and, when the amount thereof exceeds 50 parts by weight, the expansion ratio is not improved and the efficiency is rather worsened.

In order to adjust the decomposition temperatures of the blowing agents, it may be possible to add a blowing accelerator.

In accordance with the present invention, the ethylene-vinyl acetate copolymers are required to be crosslinked. Without crosslinking structures, it is impossible to perform high foaming or blowing. As crosslinking means, there may usually be used various chemical means including crosslinking with peroxides, crosslinking with silane compounds and crosslinking by means of azide compounds or the like, but optionally the so-called radiation crosslinking by irradiation with ionizing radiation such as electron beams or the like may be used.

For the chemical crosslinking means, it is most preferred to use peroxides such as t-butylperoxybenzoate, 1,1-di(t-butylperoxy)-3,3,5-trimethylcyclohexane, 2,2-bis(t-butylperoxy)butane, dicumyl peroxide, 2,5-bis(t-butylperoxy)-2,5-dimethylhexane, 1,4-bis(t-butylperoxyisopropyl)benzene, 2,5-dimethyl-2,5-di(t-butylperoxy)hexyne-3 and the like.

The amount of the crosslinking agents to be added in accordance with the present invention may be usually from 0.1 to 10 phr and, preferably, from 0.3 to 3 phr.

The crosslinking reaction with the silane compounds may be carried out by kneading and molding a composition containing, for example, given amounts of vinyltrimethoxysilane, a peroxide and dibutyl tin dilaurylate, and leaving the composition to stand in an atmosphere having a desired temperature, such as in warm water, for a predetermined period of time.

The silane compounds to be used therefor may include, for example, vinyltris-(2-methoxyethoxysilane), γ-methacryloxypropyl trimethoxy silane or the like.

The method in accordance with the present invention may optionally use a crosslinking accelerator, usually in an amount of 0.05 to 10 phr, and preferably 0.1 to 2.0 phr. The crosslinking accelerator may include, for example, polyfunctional compounds such as cyanurate compounds, e.g., triallyl isocyanurate, triallyl cyanurate and the like; monoacrylate and monomethacrylate compounds; e.g. methoxydiethyleneglycol methacrylate and the like; diacrylate and dimethacrylate compounds, e.g., diethyleneglycol dimethacrylate, polyethyleneglycol dimethacrylate, 1,6-hexaneglycol diacrylate, 2,2-bis(4-acryloxy diethoxyphenyl)propane and the like; triacrylate and trimethacrylate compounds, e.g., trimethylolpropane trimethacrylate, trimethylolpropane triacrylate, tetramethylolpropane triacrylate and the like; tetraacrylate compounds, e.g., tetramethylolmethane tetraacrylate and the like; polybutadiene compounds, e.g., 1,2-polybutadiene and the like; maleic acid esters, e.g., divinyl maleate, dipropargyl maleate and the like; aromatic compounds having an unsaturated bond, e.g., divinylbenzene; and the like. Of these compounds, trifunctional and tetrafunctional acrylate or methacrylate compounds are preferred.

As the compositions in accordance with the present invention contain a large amount of inorganic materials, it may be possible to employ a surface treating agent such as a silane type surface treating agent, a titanate type surface treating agent and the like in order to improve the compatibility of the inorganic material with the resin. The most preferable surface treating agents may include, for example, a monoalkoxy titanate compound such as isopropyl triisostearoyl titanate, isopropyl trioctanoyl titanate, isopropyl distearoyl methacryl titanate, isopropyl diisostearoyl acryl titanate and the like.

The employment of these surface treating agents in the mixture can achieve both a readiness to be kneaded and molded and an improvement in the expansion ratio.

In accordance with the present invention, there may be added, when necessary, a halogen containing fire retardant such as decabromodiphenyl ether and the like, a fire retardant synergist such as antimony trioxide and the like, an antioxidant, a copper inhibitor, an antistatic agent, a colorant, a pigment, a lubricant or any other processing agent.

Figure 2:
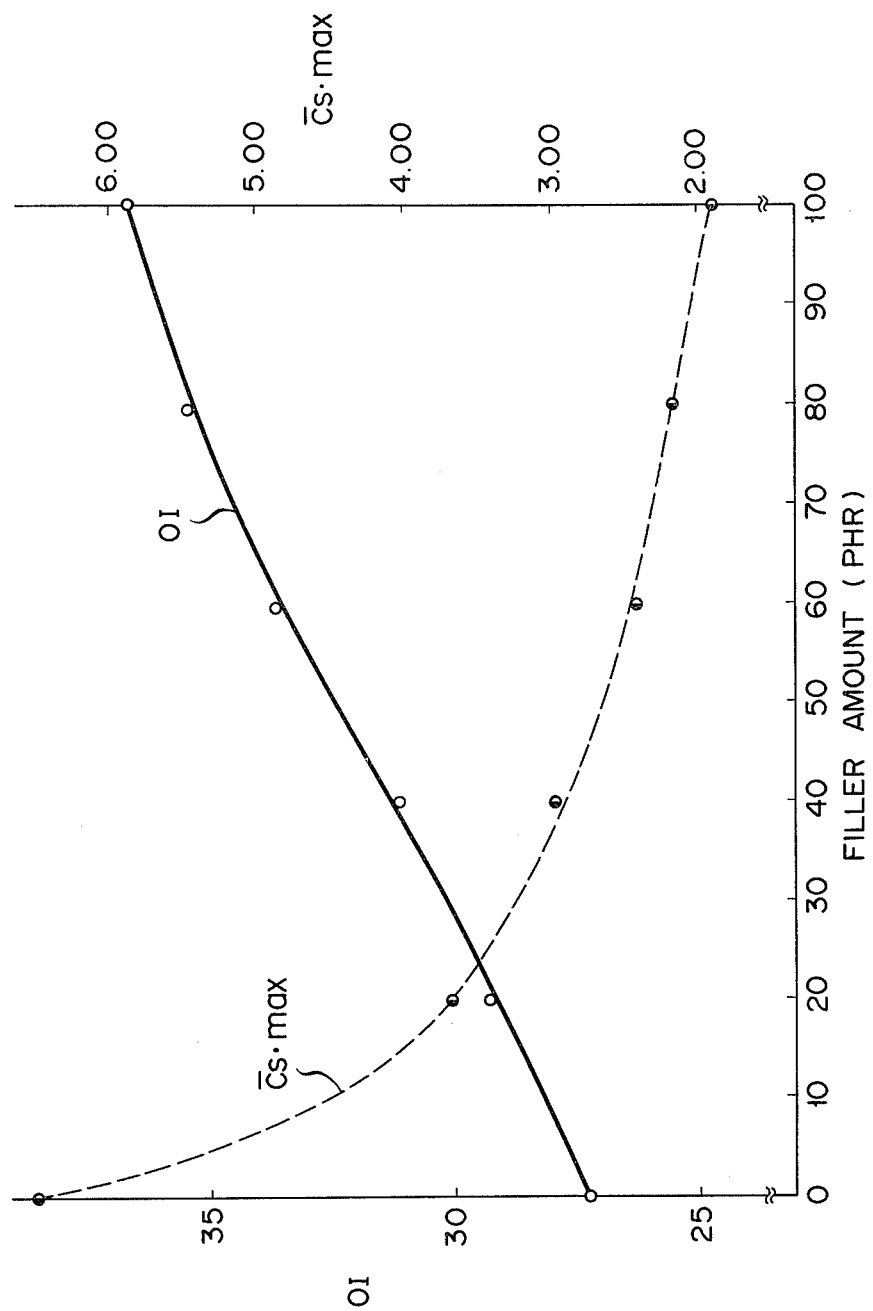
FIG. 2 is a graph in which the oxygen indices (OI) and the average maximum light attenuation coefficient ($\overline{Cs}$.max) indicating the amount of smoke are plotted with respect to the filler amount, i.e., the amount of aluminum hydroxide added (abscissa).

In accordance with the present invention, foams having a particularly superior fire retardancy are obtained by a combination of a hydrated metal oxide such as aluminum hydroxide, magnesium hydroxide, basic calcium carbonate or the like as an inorganic material with a so-called halogen containing fire retardant. In this case, the hydrate such as aluminum hydroxide or the like can play a great role in decreasing the smoke emission which is remarkably increased by the addition of the halogen containing fire retardant. The hydrate can also increase the fire retardancy, thereby leading to fire retardant foams having low smoke emission. FIG. 2 illustrates an example of the relationship of the fire retardancy and smoke emission to the filler amount, i.e., the amount of aluminum hydroxide added in a foam having an expansion ratio of about 40 obtained by the method in accordance with the present invention. In the relationship as represented hereinabove, the fire retardancy is represented as the oxygen index (OI), and the smoke emission is represented by the average maximum light attenuation coefficient ($\overline{Cs}$.max). The test was carried out in accordance with JIS D 1201-1973 "Test Method for Flammability of Organic Interior Materials for Automobiles". It was shown that the effect of the addition of aluminum hydroxide is great with respect to the oxygen index (OI) and the average maximum light attenuation coefficient ($\overline{Cs}$.max) and, particularly, that the coefficient which is an index for the smoke emission, decreased exponentially.

A foam having high fire retardancy and low smoke emission, that is, incompatible properties, has been demanded as a thermal insulation material for building use. The foams in accordance with the present invention can be evaluated as having such properties when measured on the basis of the aforementioned JIS A 1321-1975 "Testing Method for Incombustibility of Internal Finish Material and Procedure of Buildings". In this case, it is preferable to employ a halogen containing fire retardant having the following characteristics. It preferably posesses a bromine content of 40 to 80% by weight and two or more recurring units in its chemical structure, and may include, for example, bisphenol A-tetrabromo bisphenol A-epichlorohydrin glycidyletherified condensates, an adduct of tetrabromobisphenol A diglycidyl ether and brominated bisphenol, poly-[4,4'-isopropylidene bis(2,6-dibromophenyl)carbonate], brominated polyphenylene oxide and the like. Specific materials which are commercially available may include, for example, EBR-700 (bromine content, about 52% by weight; product of Matsunaga Kagaku K.K.), FIRE GUARD 7000 series (bromine content, about 50% by weight; products of Teijin Kasei K.K.), HR-128F (bromine content, about 50% by weight; product of Hitachi Chemical Co., Ltd.), Firemaster 935 (Velsicol Co.,) and the like.

Further description will be made of the chemical crosslinking method applicable to the method in accordance with the present invention. This method can provide the crosslinked foams by kneading a formulation containing the resin components, inorganic material powders, a blowing agent, crosslinking agent and, when necessary, additives as mentioned hereinabove; molding the mixture into the molded expandable composition; and heat treating the molded body. In this method, it is essential to control the water content in the molded expandable composition before the heat treatment by means of the crosslinking and foaming procedures.

As mentioned hereinabove, since the water content exerts an influence on the crosslinking of the copolymers, the water content at the stage immediately before the crosslinking procedures is at issue. Accordingly, it is necessary to control the water content immediately before the crosslinking step where the crosslinking and the foaming are carried out in two separate steps, or immediately before the crosslinking and foaming step where both steps are carried out simultaneously or in a single step. The control of the water content may be conducted in any other stage such as the raw material stage involving the ethylene-vinyl acetate copolymers, the stage of the expandable composition pellets after kneading, and the stage of the expandable composition molded body after molding.

Various methods of dehydration may be applied in this method in accordance with the present invention, for example, including a procedure in which a desiccating agent such as silica gel is placed in a container or a closed package in which the resin or the composition is filled; a procedure of thermally drying the raw materials containing the resin, the composition pellets or the molded body by means of hot air, infrared radiation or far infrared radiation; a procedure of vacuum treatment; a procedure of dehydration during the step of extrusion by means of a hopper dryer or a vacuum hopper or during the molding by means of vent type screws; and the like. These procedures may be applied singly or in combination.

These procedures can allow the water content in the molded body of the expandable composition immediately before the crosslinking treatment step to be below 0.15% by weight, preferably below 0.07% by weight with respect to the composition.

The water content of the molded body of the composition in accordance with the present invention can be measured and defined as follows:

An expandable composition in the form of a sheet having a thickness of 2–3 mm and an area of 30×30 mm is placed in a desiccator with a silica gel desiccating agent at a temperature of 30° C. after the initial weight ($W_o$) is measured. Its weight ($W_1$) is measured after being left for 10 days. In this case, the water content is determined as follows:

$$\text{Water content} = \frac{W_o - W_1}{W_1} \times 100 \text{ (\% by weight)}$$

Figure 3:
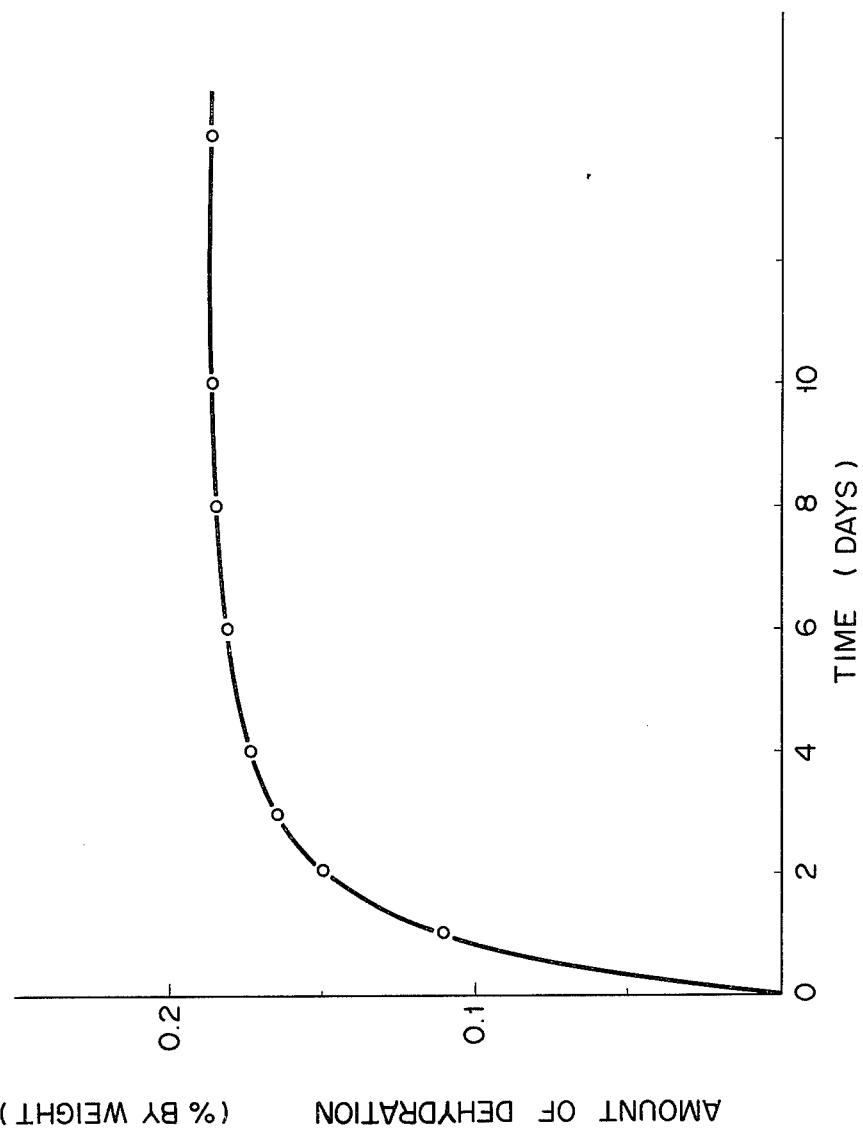
FIG. 3 is a graph illustrating the relationship between the amount of dehydration and the days spent in drying when a sheet of the expandable composition is dried in a desiccator with silica gel.

The water content is defined as above. FIG. 3 illustrates an example of the results showing the variations with time of the weight of the sheet used for measurement hereinabove. As a result, it was found that, although continuous decreases in weight to a very minute extent were recognized, it reached a substantially constant weight after 7 to 10 days; thus, it was decided that the water content was to be defined as above.

It is to be noted that the water present in the polymers containing the fillers such as the inorganic materials or other additives is not present in a single state, but in extremely complicated combination states in which it is present in the polymer in dissolved form, it is adsorbed on the surfaces of the fillers, and it adheres to the surfaces thereof. In accordance with the present invention, on the other hand, the crosslinking is accompanied, primarily, with the heat treatment so that there may be some water present in the composition which will be removed readily at the initial heating stage and which will not participate in the corsslinking at all. Accordingly, the inclusion of water itself is not at issue, but the amount of water exerting an influence on the crosslinking is critical. The water content as determined hereinabove has an extremely good correlation with foaming performance as presented in the examples to follow so that it may be considered to be the amount of water which exerts a direct influence on the crosslinking.

In accordance with the present invention, it is preferable to carry out, for the dehydration treatment, a method of heat treating the molded body of the expandable composition, e.g., in the form of extruded sheets in many cases. Thus, the molded bodies may be heat treated at a temperature of 80° to 140° C. for 1 to 30 minutes at the stage before the crosslinking step, thereby improving the expansion ratio. In this case, it is of course preferable to employ this step in combination with a dehydration treatment of the raw materials or composition, usually in the form of composition pellets, containing the resin.

The method in accordance with the present invention is particularly advantageous for carrying out the crosslinking and the foaming treatments under normal pressure. The crosslinking and foaming treatments under normal pressure involve preparation of the crosslinked foams by heating the molded body of the expandable composition by means of a hot air oven, an infrared oven, a molten salt heating furnace or the like under a pressure substantially equal to atmospheric pressure without imposing any specially elevated pressures at temperatures higher than the decomposition temperature of the blowing agent employed. This method is appropriate for the manufacture of continuous foam sheets.

When the expandable shaped composition having the components as mentioned hereinabove in accordance with the present invention are heated under normal pressure at temperatures higher than 200° C., crosslinking tends to occur before the blowing expansion on account of the difference in the decomposition temperatures of the crosslinking agent and the blowing agent. Actually, however, the two phenomena proceed in a partly competitive manner. Accordingly, when a large amount of inorganic material powders are filled in the polymer and the crosslinking is influenced by the presence of impurities such as a small amount of water, a slight variation in crosslinking structure may exert a great influence on the formation of cells and may control the properties of the foams resulting from the compositions.

The following description concerns what should be noted with respect to the crosslinking method by means of the ionizing radiation in accordance with the present invention.

In accordance with this method, it is essential to use a noncrystalline ethylene-vinyl acetate copolymer having a vinyl acetate content of 40 to 90% as the main component of the resin. Where a thermoplastic resin is blended with the ethylene-vinyl acetate copolymer, it is preferred to use, in an amount of 50% by weight or less, an ethylenic polymer such as polyethylene, ethylene-vinyl acetate-vinyl chloride copolymer, crystalline ethylene-vinyl acetate copolymer having a vinyl acetate content of 5 to 30%, ethylene-ethyl acrylate copolymer or the like.

Furthermore, it is preferred to add a metallic salt of a carboxylic acid, that is, a salt of a carboxylic acid such as stearic acid, capric acid, caproic acid, lauric acid, butyric acid or the like with a metal such as zinc, lead, aluminum or the like in an amount of 1 to 5 parts by weight. These may be added usually in an amount of about 1 phr as lubricants. In accordance with the present invention, the compounds not only function as lubricants, but also exhibit a combination of effects of increasing the expansion ratio and decreasing the optimum irradiation dose necessary for providing the foams having a high degree of expansion. For this purpose, it is preferred to add the salt in an amount of 2 to 4 phr. In particular, zinc stearate and lead stearate are appropriate.

Embodiments of the steps of manufacturing the foams in accordance with the present invention will be described hereinbelow.

Predetermined weights of the polymer, the inorganic material powder, the blowing agent and, when necessary, the fire retardant or fire-retardant synergist and other necessary additives are kneaded by means of a Banbury mixer, a kneader mixer, a two-roll mill or, optionally, a twin screw extruder. The compositions in accordance with the present invention may be molded usually by extrusion into sheets by means of the extruder after the kneading and pelletizing steps, and also may be molded by direct extrusion into sheets by means of the twin screw extruder. Where the crosslinking is effected by the chemical crosslinking means, one or more of the dehydration treatment are carried out: the dehydration of the raw material containing the polymer, the dehydration of the kneaded pellets, the dehydration during the extrusion, and the dehydration of the extrudate. Where the crosslinking is carried out by means of the ionizing radiation, the crosslinking can be effected merely by irradiating the extrudate in the form of a sheet with an electron beam of 1 to 5 Mrad, and no dehydration treatment is required.

The expandable compositions are then led to a heating device such as a hot air oven, an infrared oven, a molten salt bath or the like for foaming to provide a continuous foam sheet. The foam sheet may range usually from 2 to 20 mm in thickness and from 1,000 to 1,500 mm in width, although it may vary with the size of the device used. Where the heat treatment is carried out as a dehydration treatment means, it is preferred to mount a device for the heat treatment immediately before the foaming device.

In the method in accordance with the present invention, as mentioned hereinabove, the chemical crosslinking technique requires the dehydration treatment, while the radiation crosslinking technique does not require the dehydration treatment. However, the radiation crosslinking treatment requires expensive irradiation apparatus to provide the foams in accordance with the present invention and cannot allow the production of a thick foam. The foams obtained through this crosslinking technique provide a somewhat low expansion ratio. On the other hand, the chemical crosslinking technique can produce a thick foam with a high expansion ratio. Accordingly, either of the techniques can be applied to the method in accordance with the present invention, the particular technique being decided according to various conditions.

The foams in accordance with the present invention find various applications for making the best use of their characteristics. They may be molded into a pipe form for use as thermal insulation pipe coverings or into a sheet form for use as wrapping materials, packing materials, cushioning materials, clothing materials, floating materials or the like. They may also be used for building materials and materials for automobiles, railway vehicles, ships and aircraft to which strict legal requirements are applied with respect to flammability and smoke emission of materials, because of their low smoke emission and high fire retardant characteristics. They may also be employed extensively in composite states with a metal sheet such as an iron sheet or a metal foil, or an inorganic material in a fibrous or sheet film form.

EXAMPLES 1 THROUGH 6 AND COMPARATIVE EXAMPLES 1 THROUGH 6

To 100 parts by weight of a resin component containing an ethylene-vinyl acetate copolymer having a vinyl acetate content of 25% by weight (Mitsui Polychemical Co., Ltd.; EVAFLEX 360) and an ethylene-vinyl acetate copolymer having a vinyl acetate content of 61% by weight (Dainippon Ink & Chemicals Inc.; EVATH- LENE 450-P) in various ratios as presented in Table 1 below, were added 100 parts by weight of aluminum hydroxide powders (showa Denko K.K.; HIGILITE H-42M), 25 parts by weight of azodicarbonamide (ACDA) as a blowing agent (Eiwa Chemical Industry Co., Ltd.; VINYFOR AC#1L), dicumyl peroxide (DCP) as a crosslinking agent (Mitsui Petrochemical Industries, LTD.), and trimethylol propane triacrylate as a polyfunctional monomer (Shinnakamura Chemical Co., Ltd.; A-TMPT) in amounts as presented in Table 1. To the mixture were added 3 parts by weight of a titanate type coupling agent (Kenrich Petrochemicals INC.; Ken-React TTS) and 1 part by weight of calcium stearate (reagent). The mixture was kneaded well at 120° C. by means of a Brabender plastograph to provide an expandable composition which in turn was molded at 120° C. by a hot press to produce an expandable sheet having a thickness of 2 mm. The sheet was cut into pieces having an area of 50×50 mm which were then tested for foaming.

The foaming tests were carried out in the following manner. For the dehydration treatment, the test sheets referred to in the example numerals in Table 1 below were placed for 3 days in a large desiccator having silica gel as a desiccant, and were foamed for 6 minutes in a hot air thermostat at 220° C. In this case, adhesion was prevented by interposing a wire net of a small mesh. On the other hand, the test sheets carrying the comparative example numerals in Table 1 below were foamed in the same manner as above after being placed in room for 3 days.

The water contents of the expandable sheets were measured according to the method described hereinabove.

Table 1 shows the water contents and densities of the obtained foams in addition to the main components of the compositions. It was found that the examples where the water content was decreased by the dehydration treatment provided foams having a remarkably increased expansion ratio, regardless of the mixing ratio of the ethylene-vinyl acetate copolymers having varying vinyl acetate contents, whereas the comparative examples where no dehydration treatment was conducted provided the foams having a remarkably low expansion ratio.

The foam of Example 5 contains aluminum hydroxide powder in the amount of 150 phr, and the foam of Example 6 contains aluminum hydroxide in the amount of 70 phr. In both cases, foams having remarkably high expansion ratios were provided. In the comparative examples where no dehydration treatment was carried out, the expansion ratios remained to be several times in each case.

TABLE 1

| | Composition (partial) | | | | Dehydration Treatment | Water Content (wt %) | Foam | |
|---|---|---|---|---|---|---|---|---|
| | VAE (450P) | EVA (EV360) | DCP/A-T | Al(OH)$_3$ | | | Density (g/cm$^3$) | Expansion Ratio |
| Example 1 | 0 | 100 | 0.7/0.7 | 100 | Performed | 0.01 | 0.049 | 28.3 |
| Comparative Example 1 | 0 | 100 | 0.7/0.7 | 100 | Not Performed | 0.10 | 0.431 | 3.2 |
| Example 2 | 20 | 80 | 1.0/0.7 | 100 | Performed | 0.02 | 0.040 | 34.0 |
| Comparative Example 2 | 20 | 80 | 1.0/0.7 | 100 | Not Performed | 0.17 | 0.410 | 3.4 |
| Example 3 | 40 | 60 | 1.5/0.5 | 100 | Performed | 0.02 | 0.042 | 33.0 |
| Comparative Example 3 | 40 | 60 | 1.5/0.5 | 100 | Not Performed | 0.22 | 0.362 | 3.9 |
| Example 4 | 60 | 40 | 1.5/0.5 | 100 | Performed | 0.02 | 0.038 | 38.0 |
| Comparative Example 4 | 60 | 40 | 1.5/0.5 | 100 | Not Performed | 0.26 | 0.332 | 4.3 |
| Example 5 | 60 | 40 | 1.7/0.5 | 150 | Performed | 0.01 | 0.053 | 29.1 |
| Comparative Example 5 | 60 | 40 | 1.7/0.5 | 150 | Not Performed | 0.19 | 0.415 | 3.7 |
| Example 6 | 60 | 40 | 1.0/1.0 | 70 | Performed | 0.02 | 0.033 | 40.9 |
| Comparative Example 6 | 60 | 40 | 1.0/1.0 | 70 | Not Performed | 0.34 | 0.281 | 4.8 |

EXAMPLES 7 THROUGH 9 AND COMPARATIVE EXAMPLES 7 THROUGH 9

The examples show the cases in which the type of fillers were varied. Compositions containing 100 parts by weight of an ethylene-vinyl acetate copolymer having a vinyl acetate content of 61% by weight, 100 parts by weight of the filler, 23 parts by weight of ADCA as a blowing agent, 2 parts by weight of DCP as a crosslinking agent and 0.5 part by weight of trimethylolpropane triacrylate as a polyfunctional monomer (Shinnakamura Chemical Co., Ltd.; A-TMPT) were treated and tested in the same manner as in Examples 1 through 6 above.

The components and the results are shown in Table 2. It is apparent from the results of Table 2 that the fillers such as aluminum hydroxide, calcium carbonate and magnesium hydroxide can provide a remarkably high expansion ratio in each case when the dehydration treatment is performed.

TABLE 2

| | Composition (Total) | | | | | | | Foam | |
|---|---|---|---|---|---|---|---|---|---|
| | Polymer (450P) | Filler | Blowing Agent (ADCA) | Crosslinking Agent (DCP) | Polyfunctional Monomer (A-TMPT) | Dehydration Treatment | Water Content (wt %) | Density (g/cm$^3$) | Expansion Ratio |
| Example 7 | 100 | Al(OH)$_3$* 100 | 23 | 2 | 0.5 | Performed | 0 | 0.040 | 36.5 |
| Comparative Example 7 | 100 | 100 | 23 | 2 | 0.5 | Not Performed | 0.51 | 0.187 | 7.8 |
| Example 8 | 100 | CaCO$_3$** 100 | 23 | 2 | 0.5 | Performed | 0 | 0.048 | 31.3 |

TABLE 2-continued

| | Composition (Total) | | | | | | Foam | |
|---|---|---|---|---|---|---|---|---|
| | Polymer Filler (450P) | | Blowing Agent (ADCA) | Crosslinking Agent (DCP) | Polyfunctional Monomer (A-TMPT) | Dehydration Treatment | Water Content (wt %) | Density (g/cm³) | Expansion Ratio |
| Comparative Example 8 | 100 | 100 | 23 | 2 | 0.5 | Not Performed | 0.46 | 0.241 | 6.3 |
| | | Mg(OH)₂*** | | | | | | | |
| Example 9 | 100 | 100 | 23 | 2 | 0.5 | Performed | 0 | 0.046 | 31.4 |
| Comparative Example 9 | 100 | 100 | 23 | 2 | 0.5 | Not Performed | 0.52 | 0.136 | 10.7 |

SHWA DENKO K.K.; HIGILITE H-42M
**SHIRAISHI CALUCIUM KAISHA LTD.; WHITON SSB
***KONOSHIMA CHEMICAL CO., LTD.; MG(OH)₂ #200

EXAMPLE 10 AND COMPARATIVE EXAMPLE 10

This example shows a case in which the influence which the water content in the expandable sheet exerts over the foaming may vary with the type of ethylene-vinyl acetate copolymer.

To 100 parts by weight of the resin component containing an ethylene-vinyl acetate copolymer having a vinyl acetate content of 61% by weight (Dainippon Ink & Chemicals Inc.; EVATHLENE 450-P) and an ethylene-vinyl acetate copolymer having a vinyl acetate content of 25% by weight (Mitsui Polychemical Co., Ltd.; EVAFLEX 360) in varying mixing ratios as represented hereinbelow, were added 100 parts by weight of aluminum hydroxide powders (Showa Denko K.K.; HIGILITE H-42M); 3 parts by weight of a titanate type coupling agent (Kenrich Petrochemicals INC.; KEN-REACT TTS), 25 parts by weight of azodicarbonamide (Eiwa Chemical Ind. Co., Ltd.; VINYFOR AC#1L), 25 parts by weight of decabromodiphenyl ether as a fire retardant (Toyo Soda Mfg. Co., Ltd.; EB-10FP), 12.5 parts by weight of antimony trioxide (Nippon Seiko K.K.), specified amounts of dicumyl peroxide as a crosslinking agent (Mitsui Petrochemical Industries, Ltd.) and trimethylol propane triacrylate as a polyfunctional monomer (Shinnakamura Chemical Co., Ltd.; A-TMPT) and 1 part by weight of calcium stearate. The compositions were kneaded and molded in the same manner as in the examples represented hereinabove to provide an expandable sheet having a thickness of 2 mm. The amounts of DCP and A-TMPT were determined as shown hereinbelow by the previous tests to be at an optimum level with respect to each of the polymer composition.

The expandable sheets were treated for stability for 3 days in a thermostat having a temperature of 30° C. and a relative humidity of 80%; then they were treated for dehydration, and were foamed by heating in a hot air thermostat at 220° C. for 6 minutes. The dehydration treatment was conducted by placing the sheets in a desiccator having silica gel as a desiccant at 30° C. for a specified period of days but within 10 days. The water contents of the expandable sheets were measured in the same manner as presented hereinabove.

Figure 4:
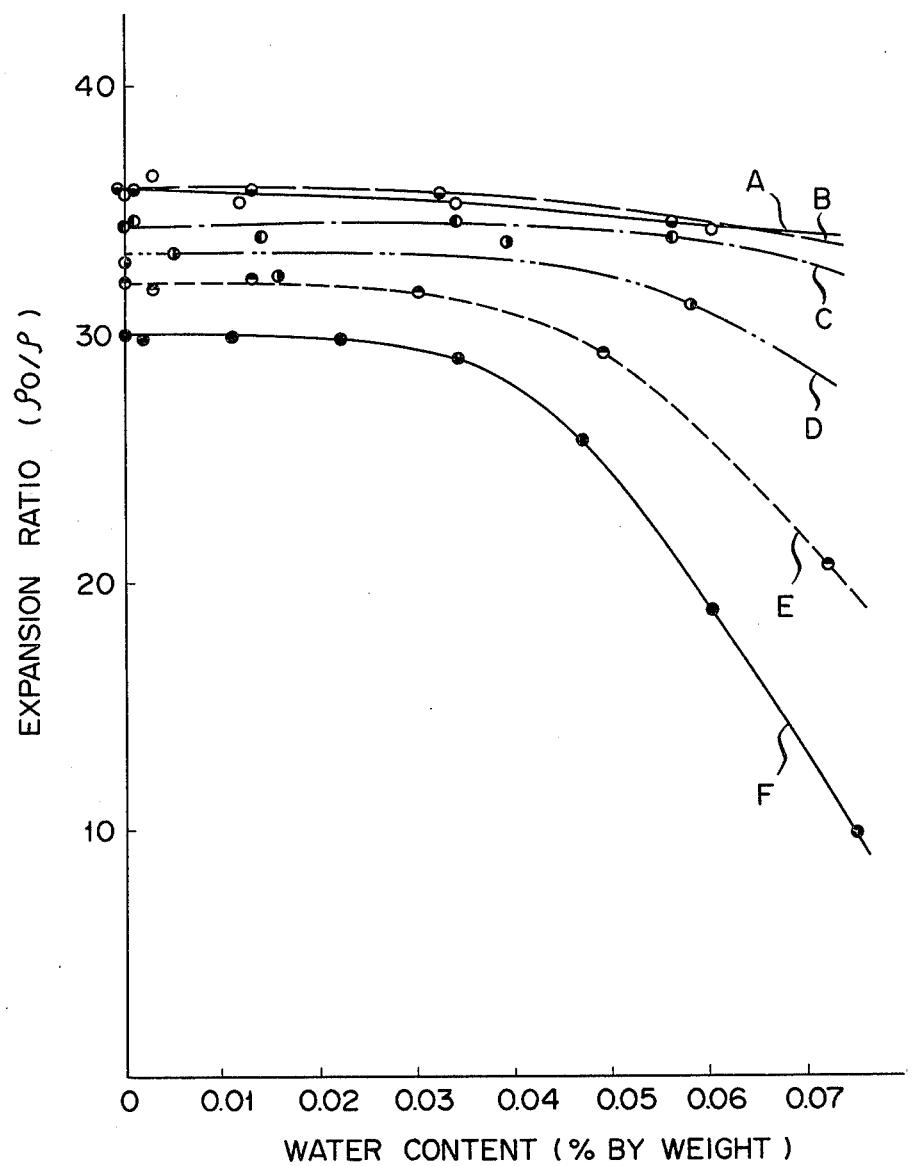
FIG. 4 is a graph illustrating the expansion of an area of a low water content as shown in FIG. 1.

FIG. 4 is a graph in which the water contents of the expandable sheets are plotted against the expansion ratios, and shows an enlarged illustration of the range where the water contents were small. In FIG. 4, the curves A and F represent an example of an ethylene-vinyl acetate copolymer having a vinyl acetate content of 61% by weight (Dainippon Ink & Chemicals Inc.; EVATHLENE 450-P) and an example of an ethylene-vinyl acetate copolymer having a vinyl acetate content of 25% by weight (Mitshi Polychemical Co. Ltd.; EVAFLEX 360), respectively; the curve B represents an example of a mixture of 80 parts by weight of the above copolymer (EVATHLENE 450-P) with 20 parts by weight of the ethylene-vinyl acetate copolymer (EVAFLEX 360); the curve C illustrates an example of a mixture of 60 parts by weight of the former with 40 parts by weight of the latter; the curve D indicates an example of a mixture of 40 parts by weight of the fomer with 60 parts by weight of the latter; and the curve E represents an example of a mixture of 20 parts by weight of the fomer with 80 parts by weight of the latter. In FIG. 4, the amounts of DCP added as the crosslinking agent and A-TMPT added as the polyfunctional monomer are as follows:

| | DCP (parts by weight) | A-TMPT (parts by weight) |
|---|---|---|
| Curve A | 2.0 | 0.7 |
| Curve B | 1.7 | 0.7 |
| Curve C | 1.5 | 0.7 |
| Curve D | 1.3 | 0.5 |
| Curve E | 1.0 | 0.7 |
| Curve F | 0.7 | 0.7 |

It was found that it is necessary to decrease the water content in the expandable sheet in order to provide a foam having a high expansion ratio. It was also shown that, as the water content is reduced to a certain level, the expansion ratios remain substantially constant. For example, in FIG. 4, the curve F where the ehtylene-vinyl acetate copolymer having the vinyl acetate content of 25% was used as the sole resin component illustrates the stabilization of the expansion ratio at about 30 when the water content is below about 0.03% by weight. On the other hand, the curve A where the ethylene-vinyl acetate copolymer having the vinyl acetate content of 61% indicates that the expansion ratio thereof is stabilized substantially at about 35 when the water content is below 0.07% by weight. In the case of the blends of the two copolymers, the expansion ratios corresponding to the mixing ratios fall between the curves A and F.

The example indicates the following:

(1) The greater are the vinyl acetate contents of the ethylene-vinyl acetate copolymers as the resin component, the higher can be the expansion ratios of the resulting foams, even if the water contents are high.

(2) Although the expansion ratios remain substantially constant when the water contents are decreased to a certain limit, the water content limit becomes greater as the vinyl acetate content increases.

(3) Where copolymers having varying in vinyl acetate contents are blended with each other, the total vinyl acetate content can be a measure of the water content limit.

EXAMPLE 11

This example illustrates the dehydration of the molded sheet of the expandable composition by vacuum treatment.

A composition containing 60 parts by weight of the ethylene-vinyl acetate copolymer having a vinyl acetate content of 61% by weight (the same as in Example 10), 40 parts by weight of the ethylene-vinyl acetate copolymer having a vinyl acetate content of 25% by weight (the same as in Example 10), 90 parts by weight of the aluminum hydroxide powders (the same as in Example 10), 25 parts by weight of decabromodiphenyl ether as a fire retardant (Toyo Soda Mfg. Co Ltd.; hereinafter abbreviated as DBDE), 12.5 parts by weight of antimony trioxide (the same as in Example 10), 25 parts by weight of azodicarbonamide as a blowing agent, 1.5 parts by weight of DCP as a crosslinking agent, 3 parts by weight of a titanate type coupling agent, 1 part by weight of A-TMPT as the polyfunctional monomer, and 1 part by weight of calcium stearate was kneaded in a large kneader having a capacity of 75 liters at a temperature below 120° C. The composition was then molded into sheets by means of a two-roll mill and pelletized into pellets. The pellets were then fed to a hopper of a 65 mm diameter extruder and extruded through a T-die to provide an expandable composition sheet having a width of 250 mm and a thickness of 2.3 mm which was wound upon itself in 100 meter lengths. The rolls were placed in a large-size vacuum heating furnace at room temperature for one day. The furnace had a pressure of 3 Torr or less. The vacuum treated sheet was discharged from the furnace and immediately foamed by passing through a hot air heating foaming apparatus on a wire net conveyor. The foamed sheet was continuously discharged from the apparatus at the outlet and wound upon itself in a roll form after cooling. The foaming apparatus was arranged so as to control the inner temperatures in three separate zones, the first zone from the inlet being at 140° C., the second zone being at 190° C., and the third zone being at 250° C. The conveyor was operated to transfer the sheet at a speed of 1.5 m/min. The foamed sheet had a width of about 800 mm and a thickness of 8 mm. It also had uniform and fine cells and an expansion ratio of 34 with a specific gravity of 0.045. The water content of the sheet after the vacuum treatment was 0.041% by weight.

EXAMPLES 12 AND 13 AND COMPARATIVE EXAMPLES 11 AND 12

In these examples, the water content of the molded body of the expandable composition was controlled by carrying out a dehydration treatment on the raw materials.

A composition containing 60 parts by weight of the ethylene-vinyl acetate copolymer (EVA) having a vinyl acetate content of 69% by weight (Dainippon Ink & Chemicals Inc.; EVATHLENE 350-P), 40 parts by weight of low density polyethylene (PE) (Mitsubishi Petrochemical CO., LTD.; YUKALON YF-30), 100 parts by weight of the aluminum hydroxide powders (Showa Denko K.K.; HIGILITE H-32), 20 parts by weight of a fire retardant, 8 parts by weight of antimony trioxide, 2 parts by weight of DCP as a crosslinking agent, 0.5 part by weight of A-TMPT as a crosslinking accelerator, 23 parts by weight of ADCA as a blowing agent, and 1 part by weight of zinc stearate was kneaded and molded into a sheet having a thickness of 3 mm.

In Comparative Example 12, the aluminum hydroxide powders were pretreated by drying at 120° C. for 1 hour in a hot air thermostat before kneading. In Example 12, only the ethylene-vinyl acetate copolymer, dried at 100° C. for 1 hour before kneading, was employed. In Example 13, both the aluminum hydroxide and the ethylene-vinyl acetate copolymer which were previously dried in the same manner as above were employed. In Comparative Example 11, both the aluminum hydroxide and the ethylene-vinyl acetate copolymer which were not pre-dried in the above manner were used.

The sheet was then placed in a hot air thermostat at 220° C. for 5 minutes for foaming. The densities and other characteristics of the resulting foams are shown in Table 3 below. It is shown that, in the cases where the copolymer was pre-dried and where both the copolymer and the filler were pre-dried, the resultant foams provided high expansion ratios, whereas the foams did not provide high expansion ratios in the cases where neither the copolymer nor the filler were pre-dried and where the filler was pre-dried but the copolymer was not pre-dried. It is to be concluded that, where the raw materials are subjected to a dehydration treatment, it is necessary to dehydrate at least the copolymer.

TABLE 3

| | Composition | | | | | | Foam | |
|---|---|---|---|---|---|---|---|---|
| | EVA | PE | Al(OH)$_3$ | Cross-linking Agent | Cross-linking Accele-Rator | Dehydration Treatment | Water Content (Wt %) | Density (g/cm$^3$) | Expansion Ratio |
| Comparative Exammple 11 | 60 | 40 | 100 | 2 | 0.5 | Not Performed | 0.35 | 0.113 | 13.4 |
| Comparative Example 12 | 60 | 40 | 100[1] | 2 | 0.5 | Note[1] | 0.31 | 0.107 | 14.2 |
| Example 12 | 60[2] | 40 | 100 | 2 | 0.5 | Note[2] | 0.11 | 0.063 | 24.1 |
| Example 13 | 60[2] | 40 | 100[1] | 2 | 0.5 | Note[1][2] | 0.09 | 0.059 | 25.3 |

Methods of Drying Raw Materials
Note[1]: The filler was stored in a vacuum desiccator after treatment at 120° C. for 1 hour in a hot air thermostat.
Note[2]: The copolymer was stored in a vacuum desiccator after treatment at 110° C. for 1 hour in a hot air thermostat.

EXAMPLE 14

The expandable composition prepared in Example 11 was molded by means of a press to provide a sheet having a thickness of 3 mm, which in turn was heated in a hot air thermostat at 120° C. for specified periods (0 to 30 minutes) of time after being left for 3 days at a constant temperature and humidity bath at a temperature of 30° C. and a relative humidity of 83%. The sheet was then heated in another hot air thermostat at 220° C. for 5 minutes for crosslinking and foaming.

The results are shown in Table 4 below. It is shown that the heat treatment of the molded sheet reduced the water content and increased the expansion ratio to a remarkable extent.

TABLE 4

| Heat Treatment Time (min) | Water Content (wt %) | Foam Density (g/cm$^3$) | Expansion Ratio |
|---|---|---|---|
| 0 | 0.47 | 0.468 | 3.1 |
| 6 | 0.21 | 0.290 | 5 |
| 10 | 0.14 | 0.207 | 7 |
| 15 | 0.063 | 0.056 | 26 |
| 30 | 0.04 | 0.044 | 33 |

EXAMPLE 15

Compositions containing 60 parts by weight of the ethylene-vinyl acetate copolymer having a vinyl acetate content of 61%, 40 parts by weight of the crystalline ethylene-vinyl acetate copolymer having a vinyl acetate content of 25%, 100 parts by weight of the aluminum hydroxide powders, 3 parts by weight of a titanate coupling agent, 23 parts by weight of ADCA as a blowing agent, 20 parts by weight of a bromine type fire retardant (TEIJIN KASEI Co., Ltd.; FIRE GUARD 7100), 8 parts by weight of antimony trioxide, 2 parts by weight of DCP as a crosslinking agent, 1 part by weight of zinc stearate, and varying amounts of different types of polyfunctional monomers as shown in FIG. 5 below were tested for their foaming characteristics. The expandable composition sheets were subjected to dehydration treatment for 3 days in a desiccator having silica gel as a desiccant, and then foamed.

It is apparent from Table 5 that the trifunctional and tetrafunctional acrylic acid esters provided foams having particularly high expansion ratios.

TABLE 5

|  | A-TMPT | A-TMMT | A-TMM3 | A-BPE4 | TMPT |
|---|---|---|---|---|---|
| 0.5 (phr) | 24.6 | 27.2 | 26.9 | 4.4 | 28.0 |
| 1.0 (phr) | 27.9 | 29.0 | 28.9 | 12.1 | 27.5 |
| 2.0 (phr) | 27.2 | 14.7 | 28.9 | 26.4 | 23.1 |
| 4.0 (phr) | 9.2 | 7.0 | 8.1 | 23.5 | 5.3 |

A-TMPT; Trimethylolpropane triacrylate
A-TMMT; Tetramethylolmethane tetraacrylate
A-TMM3; Tetramethylolmethane triacrylate (triester 30%)
A-BPE4; 2,2'-bis(4-acryloxy diethoxy phenyl)propane
TMPT; Trimethylolpropane trimethacrylate

EXAMPLES 16 THROUGH 21

Compositions containing 100 parts by weight of the ethylene-vinyl acetate copolymer having a vinyl acetate content of 61% by weight, a density of 1.05 g/cm$^3$ and a melt index of 30 to 50 (Dainippon Ink & Chemicals Inc.; EVATHLENE 450-P), 100 parts by weight of aluminum hydroxide fine powders (Showa Denko K.K.; HIGILITE H-42M); 25 to 30 parts by weight of azodicarbonamide as a blowing agent (Eiwa Chemical Industry Co., Ltd.; VINYFOR AC#1L), 3 parts by weight of isopropyl-tri(isostearoyl) titanate (Kenrich Petrochemicals INC.; KEN-REACT TTS) as a surface treating agent, 1.5 parts by weight of dicumyl peroxide as a crosslinking agent (Mitsui Petrochemical Industries, Ltd.), 0.7 part by weight of trimethylolpropane triacrylate as a crosslinking accelerator (Shinnakamura Chemical Co., Ltd.), 25 parts by weight of a bromine type fire retardant (Matsunaga Kagaku K.K.; EBR-700 or Nippo Kagaku K.K.; DBDE), 12 parts by weight of antimony trioxide as a fire retardant accelerator, and 1 part by weight of calcium stearate was kneaded well in a small-sized Banbury mixer for experimental use at 110° C. to provide expandable composition pellets. The pellets in turn were formed by means of a 40 mm diameter extruder into sheets having a thickness of 2 mm. The sheets were subsequently heat treated in a hot air thermostat at 120° C. for 20 minutes and then in another hot air thermostat at 220° C. for 6 minutes to provide sheets having a high expansion ratio.

The densities, expansion ratios, amounts of the copolymers per unit volume and the like are shown in Table 6.

Examples 16 through 18 illustrate cases where the amounts of ADCA were varied between 25 and 30 parts by weight on the basis of 25 parts by weight of DBDE as the fire retardant. Examples 19 through 21 illustrate cases where the amount of ADCA was varied between 25 and 30 parts by weight on the basis of 25 parts by weight of the other fire retardant (EBR-700). These examples provided foams having remarkably high expansion ratios ranging from about 34 to 42. Although the amount of the copolymer per unit volume was extremely small, ranging from 14 to 18 g/liter in each case, the fire retardant used in Examples 19 through 21 provided higher expansion ratios than the DBDE type fire retardant.

EXAMPLES 22 AND 23

These examples illustrate cases where aluminum hydroxide powders were used in an amount of 120 parts by weight as illustrated in Table 6.

The foams prepared in the same manner as above were sliced into sheets having a thickness of about 4 mm with a skin layer on one surface thereof. Each sheet was then cut into pieces having dimensions of 22×22 cm, and the pieces were then attached to a zinc-coated iron sheet having a thickness of 0.4 mm and the same size as the foam sheet by applying heat thereto. The test pieces were then tested for surface characteristics in accordance with JIS A-1321-1975. The time-temperature area (td$\theta$) as an index of the heat build-up amount during burning and the fuming factor ($C_A$) as an index of the amount of smoke emission were measured. The results are shown in Table 6.

The densities and thicknesses of the foams are also shown in Table 6.

It is seen that both Examples 22 and 23 provided foams represented by td$\theta$=0 and CA<30; thus, they are superior foams having low heat build-up and smoke emission. In addition to this, although the thickness of the sample used in Example 22 is considerably greater than that of Example 23, the former provided characteristics similar to those shown by the sample of Example 23, so that it may be concluded that the fire retardant used in Example 22 is superior to DBDE.

TABLE 6

| Example No. | | Example 16 | Example 17 | Example 18 | Example 19 | Example 20 | Example 21 | Example 22 | Example 23 |
|---|---|---|---|---|---|---|---|---|---|
| Composition | EVATHLENE 450P | 60 | 60 | 60 | 60 | 60 | 60 | 60 | 60 |
| | EVAFLEX 360 | 40 | 40 | 40 | 40 | 40 | 40 | 40 | 40 |
| | HIGILITE H42M | 100 | 100 | 100 | 100 | 100 | 100 | 120 | 120 |
| | KR-TTS | 3 | 3 | 3 | 3 | 3 | 3 | 3 | 3 |
| | ADCA | 25 | 27 | 30 | 25 | 27 | 30 | 25 | 25 |
| | DBDE | 25 | 25 | 25 | — | — | — | — | 25 |
| | EBR-700 | — | — | — | 25 | 25 | 25 | 25 | — |
| | $Sb_2O_3$ | 12 | 12 | 12 | 12 | 12 | 12 | 12 | 12 |
| | DCP | 1.5 | 1.5 | 1.5 | 1.5 | 1.5 | 1.5 | 1.5 | 1.5 |
| | A-TMPT | 0.7 | 0.7 | 0.7 | 0.7 | 0.7 | 0.7 | 0.7 | 0.7 |
| | Calcium Stearate | 1 | 1 | 1 | 1 | 1 | 1 | 1 | 1 |
| Foam | Density (g/l) | 46.2 | 42.9 | 40.9 | 41.2 | 39.3 | 36.1 | 44.6 | 48.2 |
| | Expansion Ratio | 33.8 | 36.3 | 38.1 | 36.6 | 38.4 | 41.8 | 35.1 | 33.1 |
| | Polymer Content Per Unit Volume (g/l) | 17.9 | 16.5 | 15.7 | 16.0 | 15.2 | 13.8 | 16.0 | 17.3 |
| | $td\theta$ | | | | | | | 0 | 0 |
| | $C_A$ | | | | | | | 22 | 23 |

(Note)
With respect to $td\theta$ and $C_A$, Example 22 used a foam having a thickness of 4.3 mm as the sample, while Example 23 used a foam having a thickness of 3.6 mm as the sample.

EXAMPLES 24 THROUGH 28 AND COMPARATIVE EXAMPLES 13 THROUGH 15

The compositions having components in the amounts shown in Table 7 were kneaded with a Brabender plastograph and formed into sheets by means of a hot press. The sheets were then dehydrated for 3 days in a desiccator having silica gel as a desiccant. Foaming was effected by heating the sheets at 220° C. for 6 minutes in a hot air thermostat to give foams.

Table 7 shows the densities, expansion ratios and amounts of polymer per unit volume of the foams as well as the oxygen indices (OI) and the average maximum light attenuation coefficients ($\overline{Cs}$.max) measured in accordance with JIS D 1201-1973 "Test Methods for Flammability of Organic Interior Materials for Automobiles".

Examples 24 through 28 provided foams in accordance with the present invention, having low smoke emission and a low amounts of polymer below 20 g/liter. The variations in OI and $\overline{Cs}$.max as a function of the filler amounts are illustrated in FIG. 2. In particular, the addition of more than 50 parts by weight of filler tends to reduce the smoke emission to a great extent.

TABLE 7

| | | Comparative Example 13 | Comparative Example 14 | Comparative Example 15 | Example 24 | Example 25 | Example 26 | Example 27 | Example 28 |
|---|---|---|---|---|---|---|---|---|---|
| Composition | EVATHLENE 450P | 60 | 60 | 60 | 60 | 60 | 60 | 60 | 60 |
| | EVAFLEX 360 | 40 | 40 | 40 | 40 | 40 | 40 | 40 | 40 |
| | HIGILITE H42M | 0 | 20 | 40 | 60 | 80 | 100 | 100 | 150 |
| | KR-TTS | 0 | 0.6 | 1.2 | 1.8 | 2.4 | 3 | 3 | 4.5 |
| | VINYFOR AC#1L | 25 | 25 | 25 | 25 | 25 | 25 | 25 | 25 |
| | DBDE | 25 | 25 | 25 | 25 | 25 | 25 | 0 | 0 |
| | $SB_2O_3$ | 12.5 | 12.5 | 12.5 | 12.5 | 12.5 | 12.5 | 0 | 0 |
| | DCP | 1.5 | 1.5 | 1.5 | 1.5 | 1.5 | 1.5 | 2 | 1.7 |
| | A-TMPT | 0.75 | 0.75 | 0.75 | 0.75 | 0.75 | 0.75 | 1 | 0.5 |
| | Calcium Stearate | 1 | 1 | 1 | 1 | 1 | 1 | 1 | 1 |
| Foam | Expansion Ratio | 44.0 | 43.4 | 43.3 | 41.4 | 39.1 | 36.5 | 52.2 | 29.1 |
| | Density (g/cm³) | 0.0294 | 0.0314 | 0.0329 | 0.0356 | 0.0389 | 0.0428 | 0.0406 | 0.0531 |
| | Oxygen Index [OI] | 7.3 | 29.3 | 31.1 | 33.5 | 35.3 | 36.6 | 26.4 | 31.6 |
| | Average Maximum Light Attenuation Coefficient ($\overline{Cs}$ · max) | 6.499 | 3.701 | 2.997 | 2.391 | 2.189 | 1.894 | 0.035 | 0.018 |
| | Polymer Content Per Unit Volume | 18.9 | 17.8 | 16.7 | 16.4 | 16.3 | 16.5 | 18.3 | 19.4 |

TABLE 7-continued

| | Comparative Example 13 | Comparative Example 14 | Comparative Example 15 | Example 24 | Example 25 | Example 26 | Example 27 | Example 28 |
|---|---|---|---|---|---|---|---|---|
| (g/l) | | | | | | | | |

(Note)
Measurements of OI and C̄s · max:
Method of measuremet: JIS D 1201-1973
Apparatus for measurement: OI measuring apparatus
Apparatus for measuring smoke concentration (Suga Shikenki Seisakusho)

EXAMPLES 29 THROUGH 34

Compositions containing 100 parts by weight of a resin component composed of the ethylene-vinyl acetate copolymer having a vinyl acetate content of 61% by weight and the crystalline ethylene-vinyl acetate copolymer having a vinyl acetate content of 25% by weight in a mixing ratio of 100:0, 80:20 or 60:40, in addition to 100 parts by weight of aluminum hydroxide powders (Showa Denko K.K.; HIGILITE H-42M), 23 parts by weight of ADCA as a blowing agent, 20 parts by weight of DBDE as a fire retardant, 8 parts by weight of antimony trioxide, and 3 parts by weight of a titanate type coupling agent (TTS) were kneaded homogeneously by means of a Brabender plastograph and then formed into sheets having a thickness of 1 mm by a hot press. The sheets were irradiated with electron beams at levels of 1 to 4 Mrad in an electron beam irradiating apparatus and then heated at 200° C. for 15 minutes in a hot air thermostat to provide foams. The results of tests on these foams are shown in Table 8 as Examples 29 through 31.

Examples 32 through 34 illustrate cases where 1 part by weight of zinc stearate (reagent) was added. It may be seen from a comparison with Examples 29 through 31 that the expansion ratios tend to decrease with a increase in the amount of crystalline ethylene-vinyl acetate copolymer. It was found, however, that the addition of zinc stearate can increase the expansion ratio remarkably in any composition as shown in Examples 32 through 34, and that the effect of the addition of zinc stearate is particularly great where the amount of the crystalline ethylene-vinyl acetate copolymer is great. It was also found that the addition of zinc stearate has the effect of reducing to a lower level the irradiation dose for preventing the maximum expansion ratio.

TABLE 8

| | Composition | | | | Electron Beam Radiation | Foam | |
|---|---|---|---|---|---|---|---|
| | VAE (450P) | EVA (EV360) | Al(OH)$_3$ (H-42M) | Zinc Stearate | Dose (Mrad) | Density (g/cm$^3$) | Expansion Ratio |
| Example 29 | 100 | 0 | 100 | 0 | 1 | 0.425 | 3.7 |
| | | | | | 2 | 0.116 | 13.5 |
| | | | | | 3 | 0.076 | 20.8 |
| | | | | | 4 | 0.073 | 21.4 |
| Example 30 | 80 | 20 | 100 | 0 | 1 | 0.675 | 2.3 |
| | | | | | 2 | 0.272 | 5.7 |
| | | | | | 3 | 0.149 | 10.4 |
| | | | | | 4 | 0.105 | 14.8 |
| Example 31 | 60 | 40 | 100 | 0 | 1 | 0.697 | 2.2 |
| | | | | | 2 | 0.333 | 4.6 |
| | | | | | 3 | 0.236 | 6.5 |
| | | | | | 4 | 0.161 | 9.5 |
| Example 32 | 100 | 0 | 100 | 1 | 1 | 0.245 | 6.4 |
| | | | | | 2 | 0.061 | 25.8 |
| | | | | | 3 | 0.071 | 22.1 |
| | | | | | 4 | 0.063 | 24.8 |
| Example 33 | 80 | 20 | 100 | 1 | 1 | 0.254 | 6.1 |
| | | | | | 2 | 0.057 | 27.1 |
| | | | | | 3 | 0.062 | 25.0 |
| | | | | | 4 | 0.065 | 23.8 |
| Example 34 | 60 | 40 | 100 | 1 | 1 | 0.478 | 3.2 |
| | | | | | 2 | 0.076 | 20.2 |
| | | | | | 3 | 0.067 | 23.0 |
| | | | | | 4 | 0.067 | 22.7 |

EXAMPLES 35 THROUGH 39

The compositions having the same components as used in Examples 29 through 31 were used, except for the resin components, which contained 70 parts by weight of the ethylene-vinyl acetate copolymer (the same as in Example 29) and 30 parts by weight of the ethylene-vinyl acetate-vinyl chloride ternary copolymer (Nippon Zeon Co., Ltd.; GRAFTMER GR-5), and the addition of a predetermined amount of various stearic acid salts. The compositions were treated by irradiation with electron beams in the same manner as above to provide foams. Table 9 illustrates the main components of the compositions and the results of tests on the foams.

Examples 36 through 39, where stearic acid salts were added in amounts ranging from 1 to 3 parts by weight, provided foams having remarkably higher expansion ratios as compared with Example 35 where no stearic acid salt was added. It is further noted that the optimum irradiation dose decreased to about 2 Mrad, so the addition of the stearic acid salt was remarkably effective. Of these stearic acid salts, zinc stearate and lead stearate were particularly effective.

TABLE 9

| | Composition | | | | Electron Beam Radiation Dose (Mrad) | Foam | |
|---|---|---|---|---|---|---|---|
| | VAE (45OP) | GRAFTMER (GR-5) | Al(OH)$_3$ (H-42M) | Lubricant | | Density (g/cm$^3$) | Expansion Ratio |
| Example 35 | 70 | 30 | 100 | 0 | 1 | 0.290 | 5.5 |
| | | | | | 2 | 0.084 | 18.9 |
| | | | | | 3 | 0.082 | 19.5 |
| | | | | | 4 | 0.096 | 16.6 |
| Example 36 | 70 | 30 | 100 | Zinc stearate 2 | 1 | 0.165 | 9.6 |
| | | | | | 2 | 0.062 | 25.5 |
| | | | | | 3 | 0.068 | 23.5 |
| | | | | | 4 | 0.134 | 11.8 |
| | | | | Zinc stearate 3 | 1 | 0.208 | 7.6 |
| | | | | | 2 | 0.061 | 25.8 |
| | | | | | 3 | 0.065 | 24.3 |
| | | | | | 4 | 0.208 | 7.6 |
| Example 37 | 70 | 30 | 100 | Calcium stearate 1 | 1 | 0.212 | 7.5 |
| | | | | | 2 | 0.092 | 17.2 |
| | | | | | 3 | 0.094 | 16.9 |
| | | | | | 4 | 0.114 | 14.0 |
| | | | | 2 | 1 | 0.223 | 7.1 |
| | | | | | 2 | 0.077 | 20.7 |
| | | | | | 3 | 0.075 | 21.1 |
| | | | | | 4 | 0.099 | 16.0 |
| | | | | 3 | 1 | 0.206 | 7.7 |
| | | | | | 2 | 0.071 | 22.4 |
| | | | | | 3 | 0.078 | 20.4 |
| | | | | | 4 | 0.088 | 17.9 |
| Example 38 | 70 | 30 | 100 | Sodium stearat 2 | 1 | 0.139 | 11.4 |
| | | | | | 2 | 0.068 | 23.3 |
| | | | | | 3 | 0.069 | 23.0 |
| | | | | | 4 | 0.077 | 20.6 |
| Example 39 | 70 | 30 | 100 | Lead stearate 2 | 1 | 0.240 | 6.6 |
| | | | | | 2 | 0.055 | 28.6 |
| | | | | | 3 | 0.055 | 28.8 |
| | | | | | 4 | 0.068 | 23.4 |

EXAMPLE 40

A composition containing 100 parts by weight of a commercially available ethylene-vinyl acetate copolymer (Nippon Synthetic Chemical Industry Co., Ltd.; SOARLEX CN; vinyl acetate content, 60% by weight; melt index, 50–100; density, 1.05 g/cm$^3$), 150 parts by weight of heavy calcium carbonate fine powder (Nitto Funka K.K.; NS#1000; density, 2.7 g/cm$^3$, average particle size, 0.4 μm), 30 parts by weight of azodicarbonamide (Eiwa Chemical Industry Co., Ltd.; VAC#1L) and 3 parts by weight of dicumyl peroxide (Nippon Oil & Fats Co., Ltd.; PERCUMYL-D) was kneaded at 120° C. for 5 minutes by means of a small-sized Banbury mixer. A portion of the mixture was formed into a sheet having a thickness of 3 mm by means of a hot press. The sheet was held at 160° C. for 10 minutes between the plates of the hot press to decompose the dicumyl peroxide and bring about the crosslinking. After the expandable sheet was cooled and withdrawn, it was heated at 200° C. for 15 minutes in a hot air thermostat to promote the foaming to a remarkable extent, thereby producing a foam having a density of 0.045 g/cm$^3$. The foam was found to have extremely fine cells and an independent cell structure when observed in pictures taken by means of a scanning electron microscope. The small pieces of the foam were pressed by means of a hot press to form a sheet having no cells which had a density of 1.64 g/cm$^3$. Accordingly, it was determined that the foam was foamed as much as 36.6 times the original volume of the material. The foam was then extracted with hot toluene at 90° C. for 10 hours to leave a residue which in turn was removed and dried both in air and in vacuo. The residual materials were weighed and then burned completely to measure the content of inorganic materials and to determine the gel content. The gel content was found to be 76%.

The foam was then measured for its percentage variation in size by heating according to JIS 6767, and was found to contract by 5% at 180° C. This means that the foam had an extremely favorable heat resistance. The amount of polymer per unit volume of the foam was 16.6 g/liter.

EXAMPLE 41

A composition-containing 100 parts by weight of the same ethylene-vinyl acetate copolymer as used in Example 1 and 150 parts by weight of the aluminum hydroxide (Showa Denko K.K.; HIGILITE H-42M; density, 2.42 g/cm$^3$; average particle size, 1 μm) to which the same blowing agent and crosslinking agent as in Example 1 were added was molded and foamed to provide a foam having a density of 0.040 g/cm$^3$ and an expansion ratio of 38.

The foam was measured for its dimensional change ratio under heating in the same manner as in Example 40; this was found to be a 3% contraction at 160° C. The foam was further sliced into pieces having a thickness of 4 mm and cut into a sheet having dimensions of 22×22 mm. The sheet was in turn attached to a zinc-plated iron sheet having a thickness of 0.4 mm and of the same size as the foam sheet. The test specimen was subjected to a burning test in accordance with JIS A 1321-1975, and was rated at Grade 1 incombustibility (i.e., td$\theta$=0, CA$\leq$30). The amount of polymer in the foam was 15.1 g/liter.

What we claim is:

1. A crosslinked foam having an expansion ratio of 25 to 60 comprising a composition containing 100 parts by weight of a resin component consisting of a non-crystalline ethylene-vinyl acetate copolymer having a vinyl acetate content in the range of 40 to 90% by weight or a mixture thereof with an amount not more than 80% by weight of a thermoplastic resin, and 50 to 500 parts by weight of an inorganic powder material which is at least one powder selected from the group consisting of aluminum hydroxide powder and magnesium hydroxide powder.

2. A crosslinked foam as claimed in claim 1, wherein said resin component consists essentially of a non-crystalline ethylene-vinyl acetate copolymer having a vinyl acetate content of 40 to 90% by weight.

3. A crosslinked foam as claimed in claim 1, wherein the thermoplastic resin is at least one ethylene polymer selected from the group consisting of polyethlene, ethylene-α-olefin copolymer, ethylene-vinyl acetate copolymer having a vinyl acetate content of 5 to 30% by weight, ethylene-vinyl acrylate copolymer, ethylene-propylene copolymer, and ethylene-vinyl acetate-vinyl chloride copolymer.

4. A crosslinked foam as claimed in claim 1, wherein said foam contains a fire retardant in an amount of 5 to 30 phr and a fire retardant synergist in an amount of 2 to 20 phr.

5. A crosslinked foam as claimed in claim 4, wherein the fire retardant has a bromine content of 40 to 80% by weight and at least two recurring units in its chemical structure.

6. A crosslinked foam as claimed in claim 1, wherein the inorganic powder material is aluminum hydroxide powder.

7. A crosslinked foam as claimed in claim 1, wherein said foam contains the resin component in an amount of less than 20 g/liter.

8. A crosslinked foam as claimed in claim 1, wherein the inorganic powder material is subjected to a surface treatment with a monoalkoxy organotitanate compound.

9. A process for producing a crosslinked foam containing a high concentration of an inorganic material and having a high expansion ratio which comprises, heating an expandable composition containing 100 parts by weight of a resin component consisting of a non-crystalline ethylene-vinyl acetate copolymer having a vinyl acetate content in the range of 40 to 90% by weight or a blend thereof with an amount of not more than 80% by weight of at least one compatible thermoplastic resin, 50 to 500 parts by weight of an inorganic powder material which is at least one powder selected from the group consisting of aluminum hydroxide powder and magnesium hydroxide powder, 5 to 50 parts by weight of a blowing agent and 0.1 to 10 parts by weight of a crosslinking agent, the water content of said expandable composition being not higher than 0.15% by weight.

10. A process as claimed in claim 9, wherein the water content is not higher than 0.07% by weight.

11. A process as claimed in claim 9, wherein the expandable composition contains a polyfunctional monomer as a crosslinking accelerator in an amount of 0.1 to 10 parts by weight.

12. A process as claimed in claim 9, wherein said resin component consists essentially of a non-crystalline ethylene-vinyl acetate copolymer having a vinyl acetate content in the range of 40 to 90% by weight.

13. A process as claimed in claim 9, wherein the thermoplastic resin is at least one polymer selected from the group consisting of polyethylene, ethylene-α-olefin copolymer, ethylene-vinyl acetate copolymer having a vinyl acetate content of 5 to 30% by weight, ethylene-ethyl acrylate copolymer, ethylene-propylene copolymer and ethylene-vinyl acetate-vinyl chloride copolymer.

14. A process as claimed in claim 9, wherein the expandable composition is heated under normal pressure to cause crosslinking and foaming.

15. A process as claimed in claim 9, wherein the expandable composition further contains a fire retardant in an amount of 5 to 30 phr and a fire retardant synergist in an amount of 2 to 20 phr.

16. A process as claimed in claim 15, wherein the fire retardant has a bromine content of 40 to 80% by weight and at least two recurring units in the chemical structure thereof.

17. A process as claimed in claim 9, wherein the expandable composition is heated at 80° to 140° C. to reduce the water content to not higher than 0.15% by weight.

18. A process as claimed in claim 11, wherein the polyfunctional monomer is a trifunctional or a tetrafunctional acrylate or methacrylate.

19. A process for producing an ethylene-vinyl acetate copolymer foam containing an inorganic material characterized in that a composition containing 100 parts by weight of a resin component consisting of a non-crystalline ethylene-vinyl acetate copolymer having a vinyl acetate content in the range of 40 to 90% by weight or a blend thereof with an amount not more than 80% by weight of a thermoplastic resin, 50 to 500 parts by weight of an inorganic powder material which is at least one powder selected from the group consisting of aluminum hydroxide powder and magnesium hydroxide powder and 5 to 50 parts by weight of a blowing agent is molded, crosslinked by irradiation with ionizing radiation, and foamed by heating at a temperature higher than the decomposition temperature of the blowing agent.

20. A process for producing the foam as claimed in claim 19, wherein the thermoplastic resin is at least one ethylene polymer selected from the group consisting of polyethylene, ethylene-α-olefin copolymer, crystalline ethylene-vinyl acetate copolymer having a vinyl acetate content of 5 to 30% by weight, ethylene-vinyl acetate-vinyl chloride copolymer, ethylene-ethyl acrylate copolymer and ethylene-propylene copolymer.

21. A process as claimed in claim 19, wherein the composition further contains a fire retardant in an amount of 5 to 30 phr and a fire retardant synergist in an amount of 2 to 20 phr.

22. A process as claimed in claim 21, wherein the fire retardant has a bromine content of 40 to 80% by weight and at least two recurring units in its chemical structure.

23. A process as claimed in claim 19, wherein the expandable composition contains a metal salt of stearic acid as an additive for improving the crosslinking and foaming properties.

* * * * *

UNITED STATES PATENT AND TRADEMARK OFFICE
CERTIFICATE OF CORRECTION

PATENT NO. : 4,446,254
DATED : May 1, 1984
INVENTOR(S) : Hiroyuki NAKAE et al

It is certified that error appears in the above-identified patent and that said Letters Patent is hereby corrected as shown below:

Column 27, line 22 (Claim 3): Replace "ethylene-vinyl acrylate" with --ethylene-ethyl acrylate--.

Signed and Sealed this

Fifteenth Day of January 1985

[SEAL]

Attest:

GERALD J. MOSSINGHOFF

Attesting Officer

Commissioner of Patents and Trademarks